United States Patent
Patil et al.

(10) Patent No.: US 9,587,473 B2
(45) Date of Patent: Mar. 7, 2017

(54) STABILIZING UNCONSOLIDATED FORMATION FOR FINES CONTROL

(71) Applicant: Halliburton Energy Services, Inc., Houston, TX (US)

(72) Inventors: Prajakta Ratnakar Patil, Pune (IN); Shoy Chittattukara George, Thrissur (IN); Prasanta Das, Laskarpur (IN)

(73) Assignee: Halliburton Energy Services, Inc., Houston, TX (US)

( * ) Notice: Subject to any disclaimer, the term of this patent is extended or adjusted under 35 U.S.C. 154(b) by 192 days.

(21) Appl. No.: 13/864,367

(22) Filed: Apr. 17, 2013

(65) Prior Publication Data

US 2014/0311740 A1    Oct. 23, 2014

(51) Int. Cl.
*E21B 43/25* (2006.01)
*C09K 8/57* (2006.01)

(52) U.S. Cl.
CPC .............. *E21B 43/25* (2013.01); *C09K 8/572* (2013.01)

(58) Field of Classification Search
None
See application file for complete search history.

(56) References Cited

U.S. PATENT DOCUMENTS

| | | | | |
|---|---|---|---|---|
| 3,587,742 | A * | 6/1971 | Wittenwyler | 166/295 |
| 4,291,766 | A * | 9/1981 | Davies et al. | 166/276 |
| 4,417,623 | A * | 11/1983 | Anthony | 166/294 |
| 5,806,593 | A * | 9/1998 | Surles | 166/270 |
| 6,439,309 | B1 * | 8/2002 | Matherly et al. | 166/276 |
| 6,772,838 | B2 * | 8/2004 | Dawson et al. | 166/280.1 |
| 7,696,275 | B2 | 4/2010 | Slay et al. | |
| 8,030,376 | B2 | 10/2011 | Kurz | |
| 8,163,677 | B2 * | 4/2012 | Endres et al. | 507/233 |
| 8,596,358 | B2 * | 12/2013 | Kotlar et al. | 166/276 |
| 2003/0102128 | A1 * | 6/2003 | Dawson et al. | 166/280 |
| 2003/0119678 | A1 | 6/2003 | Crews | |
| 2003/0230408 | A1 * | 12/2003 | Acock et al. | 166/297 |
| 2004/0177957 | A1 * | 9/2004 | Kalfayan et al. | 166/270 |

(Continued)

FOREIGN PATENT DOCUMENTS

| WO | 2009085377 A1 | 7/2009 |
|---|---|---|
| WO | 2011008409 A2 | 1/2011 |

OTHER PUBLICATIONS

The USGS Water Science School; Contaminants Found in Groundwater; Mar. 17, 2014; pp. 1-6; https://water.usgs.gov/edu/groundwater-contaminants.html.*

(Continued)

*Primary Examiner* — Angela M DiTrani
*Assistant Examiner* — Anuradha Ahuja
(74) *Attorney, Agent, or Firm* — Craig W. Roddy; Baker Botts L.L.P.

(57) ABSTRACT

A method for treating a zone of a subterranean formation penetrated by a wellbore, the method including the steps of: (A) introducing a treatment fluid through the wellbore into the zone of the subterranean formation, wherein the treatment fluid comprises an alkoxysilane having at least two alkoxy groups; (B) shutting in the zone to allow the alkoxysilane to hydrolyze in the formation under the design conditions; and (C) before or after introducing the treatment fluid into the zone, installing a mechanical sand control device in the wellbore of the zone.

18 Claims, 4 Drawing Sheets

(56) References Cited

U.S. PATENT DOCUMENTS

| | | | |
|---|---|---|---|
| 2004/0261997 A1* | 12/2004 | Nguyen et al. | 166/281 |
| 2005/0045326 A1* | 3/2005 | Nguyen | 166/278 |
| 2005/0274520 A1* | 12/2005 | Nguyen et al. | 166/295 |
| 2007/0158070 A1* | 7/2007 | Endres et al. | 166/294 |
| 2007/0277978 A1* | 12/2007 | Reddy et al. | 166/276 |
| 2007/0289781 A1* | 12/2007 | Rickman et al. | 175/65 |
| 2008/0035337 A1 | 2/2008 | Reddy et al. | |
| 2009/0173497 A1* | 7/2009 | Dusterhoft | 166/276 |
| 2009/0275489 A1 | 11/2009 | Kilaas et al. | |
| 2010/0197526 A1* | 8/2010 | Zhang | 507/105 |

OTHER PUBLICATIONS

International Search Report and Written Opinion issued in related PCT Application No. PCT/US2014/019214, mailed Jun. 25, 2014 (9 pages).

International Preliminary Report on Patentability issued in related PCT Application No. PCT/US2014/019214 mailed Oct. 20, 2015 (6 pages).

* cited by examiner

STABILIZING UNCONSOLIDATED FORMATION FOR FINES CONTROL

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not applicable.

TECHNICAL FIELD

The invention generally relates to producing oil or gas from a subterranean formation. More specifically, the invention relates to compositions and methods for use in treating a subterranean formation for controlling the migration of particulates, such as formation sand and fines.

BACKGROUND

Oil or gas is obtained from a subterranean formation by drilling a wellbore that penetrates a hydrocarbon-bearing formation. It is desirable to maximize both the rate of flow and the overall amount of flow of hydrocarbon from the subterranean formation to the surface.

One way that the rate of hydrocarbon flow and the overall amount of hydrocarbon flow can be reduced is by fines production or sand migration in the formation or by precipitation. The relatively high velocity in the permeable matrix of the subterranean formation near the wellbore is sometimes sufficient to mobilize particulates. These particulates can be carried and then plug flow channels in the formation, a proppant pack, or a gravel pack. It is desirable to minimize fines or sand migration, since such particulates block flow paths, choking the potential production of the well. In addition, such particulates can damage downhole and surface equipment, such as screens, pumps, flow lines, storage facilities, etc.

Wellbores often penetrate subterranean formations that contain unconsolidated particulates that may migrate when oil, gas, water, or other fluids are produced or flowed back from the subterranean formation.

Devices such as screens and slotted liners are often used to provide support for these unconsolidated formations to inhibit formation collapse. Usually, the annulus around the support device is gravel packed to reduce the presence of voids between the device and the borehole. Typically, such gravel packing operations involve the pumping and placement of a quantity of a desired size of particulate material into the annulus between the tubular device and the borehole of the wellbore. Gravel packing forms a filtration bed near the well bore that acts as a physical barrier to the transport of unconsolidated formation fines with the production of hydrocarbons. These support devices provide support for the wellbore and gravel packing and prevent some fines from entering the hydrocarbon flow into the well.

Some types of screens are adapted to be expanded to contact the wellbore wall either with or without gravel packing. It is however, impossible to eliminate all voids between the screen and the wellbore wall. Fines fill these voids blocking flow and in some instances fines flowing through these voids erode the screen destroying its effectiveness.

One common type of gravel packing operation involves placing a gravel pack screen in the well bore and packing the surrounding annulus between the screen and the well bore with gravel of a specific mesh size designed to prevent the passage of formation sand or fines. The gravel pack screen is generally a filter assembly used to retain the gravel placed during gravel pack operation. A wide range of sizes and screen configurations are available to suit the characteristics of the gravel pack sand. Similarly, a wide range of gravel sizes is available to suit the characteristics of the unconsolidated or poorly consolidated particulates in the subterranean formation. The resulting structure presents a barrier to migrating sand from the formation while still permitting fluid flow.

Gravel packs can be time consuming and expensive to install. Due to the time and expense needed, it is sometimes desirable to place a screen without the gravel and, particularly in cases in which an expandable screen is being placed, it may be unrealistic to place a bed of gravel between the expandable screen and the well bore. Even in circumstances in which it is practical to place a screen without a gravel pack, it is often difficult to determine an appropriate screen size to use as formation sands tend to have a wide distribution of sand grain sizes. When small quantities of sand are allowed to flow through a screen, screen erosion becomes a significant concern. As a result, the placement of gravel as well as the screen is often necessary to control the formation sands.

An expandable screen is often installed to maintain the diameter of the wellbore for ease of access at a later time by eliminating installation of conventional screens, gravel placement, and other equipment. However, the ability to provide universal screen mesh that can handle wide particle size distribution of formation sand is unrealistic, if not impossible.

Another method used to control particulates in unconsolidated formations involves consolidating a subterranean producing zone into hard, permeable masses. Consolidation of a subterranean formation zone often involves applying a resin followed by a spacer fluid and then a catalyst. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst, an exothermic reaction occurs that may result in rapid polymerization, potentially damaging the formation by plugging the pore channels, halting pumping when the well bore is plugged with solid material, or resulting in a downhole explosion as a result of the heat of polymerization. Also, these conventional processes are not practical to treat long intervals of unconsolidated regions due to the difficulty in determining whether the entire interval has been successfully treated with both the resin and the external catalyst.

In addition to the unconsolidated formation sands often found in subterranean formations, particulate materials are often introduced into subterranean zones in conjunction with conductivity enhancing operations and sand control operations. Conductivity enhancing and sand control operations may be performed as individual treatments, or may be combined where desired.

Preventing formation sand and fines from migrating from an unconsolidated formation has always been a challenge. While previously known treatment methods for unconsolidated formation provide improved particulate control, multiple treatment steps that are time consuming and expensive are usually required. Therefore, it is desirable to develop a relatively simple and relatively inexpensive treatment composition and method to improve or maintain the rate of fluid flow while reducing particulate migration.

SUMMARY OF THE INVENTION

A method for treating a zone of a subterranean formation penetrated by a wellbore is provided, wherein the method includes the steps of: (A) introducing a treatment fluid through the wellbore into the zone of the subterranean formation, wherein the treatment fluid comprises an alkoxysilane having at least two alkoxy groups; (B) shutting in the zone to allow the alkoxysilane to hydrolyze in the formation under the design conditions; and (C) before or after introducing the treatment fluid into the zone, installing a mechanical sand control device in the wellbore of the zone.

The invention can be used with any mechanical sand control device, such as a perforated liner, a slotted pipe, a wire-wrapped screen, a non-expandable screen, and an expandable screen. The invention can be used with or without gravel packing. Preferably, the methods are used without gravel packing.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the scope of the invention as expressed in the appended claims.

BRIEF DESCRIPTION OF DRAWING

The accompanying drawing is incorporated into the specification to help illustrate examples according to the presently most-preferred embodiment of the invention.

In FIG. 2, SEM micrograph (A) is without zoom. Micrographs (B) and (C) are zoom in images at 1000× in the dotted circular area of micrograph (A).

In FIG. 3, SEM micrograph (A) is without zoom. Micrograph (B) is a zoom image at 200× and micrograph (C) is a zoom image at 1000× in the dotted circular area of micrograph (A).

In FIG. 4, SEM micrograph (A) is without zoom. Micrograph (B) is a zoom image at 100× and micrograph (C) is a zoom image at 1000× in the dotted circular area of micrograph (A).

DETAILED DESCRIPTION OF PRESENTLY PREFERRED EMBODIMENTS AND BEST MODE

Definitions and Usages

General Interpretation

Figure 1:
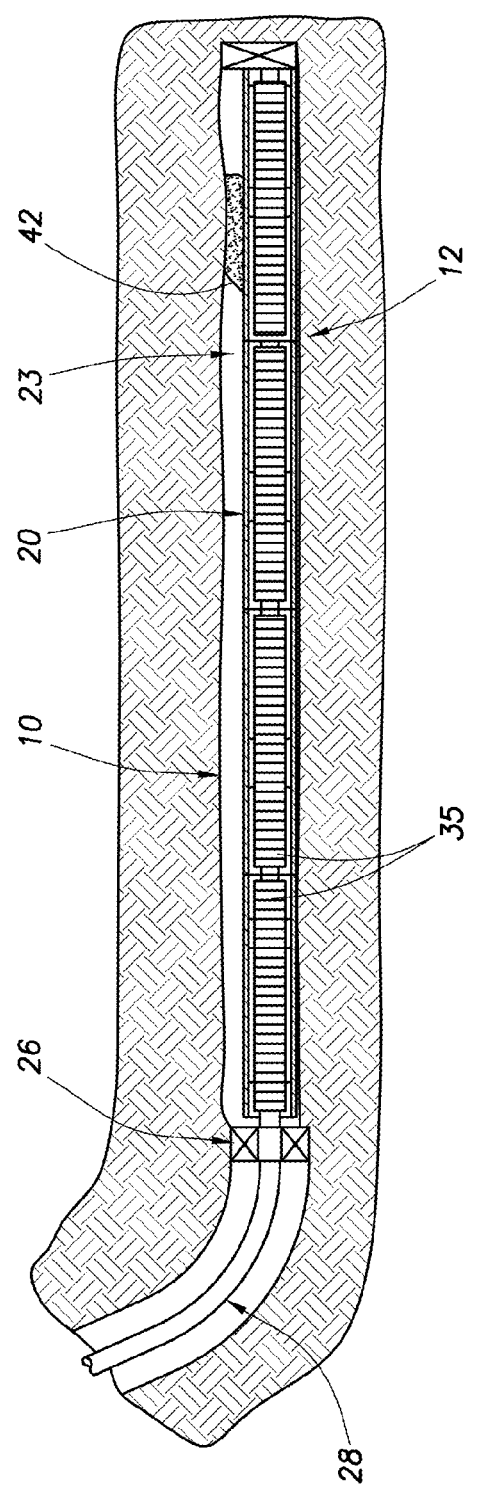
FIG. 1 is a schematic, cross-sectional view of an exemplary configuration operating environment in which the inventions of the present invention can be used depicting a screened and gravel packed portion of the wellbore extending into an unconsolidated subterranean hydrocarbon formation. It should be understood that gravel packing is not necessary. In addition, it should be understood that this figure of the drawing is not necessarily to scale.

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables and other scientific symbols used herein are selected arbitrarily or according to convention. Other algebraic variables can be used.

Subterranean Formations and Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

In geology, rock or stone is a naturally occurring solid aggregate of minerals or mineraloids. The Earth's outer solid layer, the lithosphere, is made of rock. Three major groups of rocks are igneous, sedimentary, and metamorphic. The vast majority of reservoir rocks are sedimentary rocks, but highly fractured igneous and metamorphic rocks can sometimes be reservoirs.

A consolidated formation is a geologic material for which the particles are stratified (layered), cemented, or firmly packed together (hard rock); usually occurring at a depth below the ground surface. An unconsolidated formation is a sediment that is loosely arranged or unstratified (not in layers) or whose particles are not cemented together (soft rock); occurring either at the ground surface or at a depth below the surface. In an unconsolidated or weakly consolidated formation, some particulates are insufficiently bonded in the formation to withstand the forces produced by the production or flowback of fluids through the matrix of the formation.

As used herein, a subterranean formation having greater than about 50% by weight of inorganic siliceous materials (e.g., sandstone) is referred to as a "sandstone formation."

There are conventional and non-conventional types of reservoirs. In a conventional reservoir, the hydrocarbons flow to the wellbore in a manner that can be characterized by flow through permeable media, where the permeability may or may not have been altered near the wellbore, or flow through permeable media to a permeable (conductive), bi-wing fracture placed in the formation. A conventional reservoir would typically have a permeability greater than about 1 milliDarcy (equivalent to about 1,000 microDarcy).

Wells, Well Servicing, Treatment Fluids and Zones

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, a "fluid" broadly refers to any fluid adapted to be introduced into a well for any purpose. A fluid can be, for example, a drilling fluid, a setting composition, a treatment fluid, or a spacer fluid. If a fluid is to be used in a relatively small volume, for example less than about 200 barrels (about 8,400 US gallons or about 32 $m^3$), it is sometimes referred to as a wash, dump, slug, or pill.

As used herein, the word "treatment" refers to any treatment for changing a condition of a portion of a wellbore, or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

The term "damage" as used herein regarding a subterranean formation refers to undesirable deposits in a subterranean formation that may reduce its permeability. Scale, skin, gel residue, and hydrates are contemplated by this term.

The term "sand control device" is used generically herein and is meant to include and cover all types of similar structures which are commonly used in gravel pack well completions which permit flow of fluids through the "screen" while blocking the flow of particulates (e.g., commercially-available screens; slotted or perforated liners or pipes; sintered-metal screens; sintered-sized, mesh screens; screened pipes; pre-packed screens, radially-expandable screens and/or liners; or combinations thereof).

Generally, the greater the depth of the formation, the higher the static temperature and pressure of the formation. Initially, the static pressure equals the initial pressure in the formation before production. After production begins, the static pressure approaches the average reservoir pressure.

Deviated wells are wellbores inclined at various angles to the vertical. Complex wells include inclined wellbores in high-temperature or high-pressure downhole conditions.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Phases and Physical States

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), e.g., microscopic clay particles, to about 3 millimeters, e.g., large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

It should be understood that the terms "particle" and "particulate," includes all known shapes of particles including substantially rounded, spherical, oblong, ellipsoid, rod-like, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

A particulate will have a particle size distribution ("PSD"). As used herein, "the size" of a particulate can be determined by methods known to persons skilled in the art.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Particulates smaller than about 400 U.S. Standard Mesh are usually measured or separated according to other methods because small forces such as electrostatic forces can interfere with separating tiny particulate sizes using a wire mesh.

The most commonly-used grade scale for classifying the diameters of sediments in geology is the Udden-Wentworth scale. According to this scale, a solid particulate having particles smaller than 2 mm in diameter is classified as sand, silt, or clay. Sand is a detrital grain between 2 mm (equivalent to 2,000 micrometers) and 0.0625 mm (equivalent to 62.5 micrometers) in diameter. (Sand is also a term sometimes used to refer to quartz grains or for sandstone.) Silt refers to particulate between 74 micrometers (equivalent to about −200 U.S. Standard mesh) and about 2 micrometers. Clay is a particulate smaller than 0.0039 mm (equivalent to 3.9 µm).

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

Permeability

Permeability refers to how easily fluids can flow through a material. For example, if the permeability is high, then fluids will flow more easily and more quickly through the material. If the permeability is low, then fluids will flow less easily and more slowly through the material. As used herein, unless otherwise specified, permeability is measured with light oil having an API gravity of greater than 31.1 degrees.

For gas wells, "high permeability" means the matrix of a subterranean formation has a permeability of at least 10 millidarcy (mD) and "low permeability" means the matrix has a permeability of less than 1 mD. For oil wells, "high permeability" means the matrix of a subterranean formation has a permeability of at least 30 mD and "low permeability" means the matrix has a permeability of less than 10 mD. For gravel packing, "high permeability" means the matrix of a subterranean formation has a permeability of at least 500 mD and "low permeability" means the matrix has a permeability of less than 50 mD.

General Approach

A non-resin based system according to the invention comprises a monomeric alkoxysilane having at least two alkoxy groups. Such alkoxysilanes can have the property of hydrolyzing in the presence of water to form polymeric silicon compounds such as polysiloxanes and release an alcohol compound. The polymerization proceeds via hydrolysis and condensation.

For example, tetraethyl orthosilicate ("TEOS") easily converts into polymeric silicon dioxide (silica). This reaction occurs upon the addition of water:

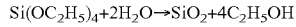

This hydrolysis reaction is an example of a sol-gel process. The side product is ethanol. The reaction proceeds via a series of condensation reactions that convert the TEOS molecule into a mineral-like solid via the formation of Si—O—Si linkages.

Without necessarily being limited by any theoretical explanation, according to the invention, such a hydrolysis in the presence of particles comprising silicon dioxide (e.g., quartz or sand) can provide the effect of agglomerating such particles through siloxane linkages —Si—O—Si—. The hydrolysis of the alkoxysilane bond with pendant hydroxyl groups on the silica material can form a bond. Thus, polymeric silicon oxide can form between adjacent particulates and bond them together.

Rates of this hydrolysis are sensitive to the presence of acids and bases, both of which serve as catalysts. Other types of catalysts can be used.

A method for treating a zone of a subterranean formation penetrated by a wellbore is provided, wherein the method includes the steps of: (A) introducing a treatment fluid through the wellbore into the zone of the subterranean formation, wherein the treatment fluid comprises an alkoxysilane having at least two alkoxy groups; (B) shutting in the zone for at least a sufficient time for at least 50% by weight of the alkoxysilane to hydrolyze in the formation under the design conditions; and (C) before or after introducing the treatment fluid into the zone, installing a mechanical sand control device in the wellbore of the zone.

The methods according to the invention can stabilize the formation particulates of sand and fines by agglomerating the particulates in the formation, thereby preventing the fines from migrating. It is believed that the agglomeration does not substantially reduce the permeability of the subterranean formation or damage the subterranean formation.

The term "regain permeability" refers to the percentage of permeability of a portion of a subterranean formation following treatment; that is, it is a percentage of the post-treatment permeability as compared to the pre-treatment permeability. In some embodiments, the methods of the present invention are able to achieve a regain permeability of at least about 90%. In some embodiments of the present invention, the regain permeability is at least about 95%.

The methods of the present invention are capable of substantially stabilizing the particulates such that loose or weakly consolidated particulates are prevented from shifting or migrating once the treatment is complete. This is particularly significant in the context of portions of formations where it is desirable to control the particulates without having to use a gravel pack. In such situations, the methods of the present invention including the use of a screen or liner (which may be an expandable or traditional screen or a perforated or slotted liner, or any similar device known in the art) can act to control particulates to a sufficiently high degree that a gravel pack becomes unnecessary.

Thus, according to the methods of the present invention, which include the use of both a treatment fluid comprising an alkoxysilane and a screen or liner, the method creates a stable, permeable region around the wellbore that resists particulate migration. The screen or liner can be used, for example, to provide mechanical support to prevent borehole collapse. Such embodiments may make the use of screen-only or liner-only (no gravel pack) completions functional over a much wider range of formation properties than previously thought possible.

In addition, the methods can be used as a remedial treatment to be injected into a treatment zone through a proppant or gravel pack of a previously performed fracturing treatment or gravel pack.

The methods can be performed in vertical, inclined, or horizontal wellbores, and in open-hole or under-reamed completions as well as in cased wells. If the method is to be carried out in a cased wellbore, the casing is perforated to provide for fluid communication with a zone of interest in the subterranean formation.

The method can optionally include the step of: before or after the step of introducing the treatment fluid, introducing a fracturing fluid into the wellbore at a pressure sufficient to create at least one fracture in the subterranean formation. For example, the composition can be used as a prior treatment to hydraulic fracturing.

Treatment Zone

Preferably, the treatment zone is an unconsolidated or weakly consolidated subterranean formation. Preferably, the treatment zone is in a subterranean formation having loose particulate of silicon dioxide such as sand or quartz particles. For example, the subterranean formation can be a sandstone formation. Preferably, the sandstone formation has at least 70% sandstone material by weight.

The subterranean formation can be, for example, a gas reservoir having a permeability greater than about 5 mD. By way of another example, the subterranean formation can be an oil reservoir having a permeability greater than about 20 mD.

Alkoxysilane

Alkoxysilane means any alkyl groups attached to the silicon atom through an oxygen atom (Si—OR). The terminal alkane groups can be anything from methyl, ethyl, propyl etc. that can be relatively easy to hydrolyze under relatively mild conditions. The longer the alkane or if the alkane is branched, however, the more difficult the hydrolysis tends to be. Accordingly, the alkoxy can be selected to help control the hydrolysis time under various design conditions for use in a well.

Preferred physical properties for the alkoxysilane are that it be a liquid under Standard Laboratory Conditions and that it be soluble or dispersible in water. It is preferable that it not hydrolyze too quickly under the design conditions so that there is time to place the alkoxysilane in the treatment zone before it substantially hydrolyzes.

Preferably, the alkoxy groups are independently selected from —OR groups wherein R is methyl, ethyl, propyl, isopropyl, butyl, and isobutyl. It is believed that longer chain or branched alkyl groups tend to make the silicon-alkoxy group less reactive. Accordingly, selecting the alkoxy groups to have longer or branched alkyl groups can be used to help control or extend the hydrolysis time. This can be particularly helpful for higher temperature design conditions for a treatment.

Preferably, the alkoxysilane is a tetra alkoxy silane, which is also known as a tetra alkoxy orthosilicate. Examples of suitable tetra alkoxy silanes include tetramethyl orthosilicate ("TMOS") having a boiling point of 122° C., tetraethyl orthosilicate ("TEOS") having a boiling point of 166° C., tetrapropyl ortho silicate ("TPOS") having a boiling point 94° C. at 5 mmHg, tetrabutyl orthosilicate ("TBOS") having a boiling point 275° C. The order of reactivity is TMOS>TEOS>TPOS>TBOS. All of these are water dispersible.

For example, tetraethoxy orthosilicate has the molecular formula $Si(OC_2H_5)_4$, molar mass of 208.33 g/mole, is a colorless liquid under Standard Laboratory Conditions, having a melting point of −77° C. (−107° F.) and a boiling point of about 166° C. (331° F.), which slowly decomposes in water due to hydrolysis. Tetramethyl orthosilicate has the molecular formula $Si(OCH_3)_4$. The chemical properties are similar to tetraethyl orthosilicate.

Preferably the alkoxysilane does not have any other type of functional group that would be subject to rapid hydrolysis or free-radical polymerization (e.g., vinyl group polymerization) under the design conditions, which would make the molecule excessively reactive during placement and interfere with the purpose of agglomerating fines in-situ in a subterranean formation. For example, the alkoxysilane preferably does not have any hydroxy or halogen on the silicon atom and preferably the alkoxysilane does not have any vinyl group.

Preferably, the alkoxysilane is in a concentration of at least 10% by weight of the continuous phase of the treatment fluid. Preferably, the alkoxysilane is in a concentration of about 10% to about 40% by weight of the continuous phase of the treatment fluid. In an embodiment, the alkoxysilane is in a concentration of about 20% by weight of the continuous phase of the treatment fluid.

Aqueous Phase of Treatment Fluid

Preferably, the treatment fluid comprises a continuous aqueous phase, wherein the alkoxysilane is dissolved or dispersed in the aqueous phase. The aqueous phase preferably comprises an inorganic salt, for example, KCl.

Optional Preflush of Treatment Zone

The method preferably additionally comprises the step of: saturating the zone of the subterranean formation with a preflush treatment fluid. The preflush treatment fluid is different than the treatment fluid with the alkoxysilane and introduced prior to the treatment fluid with the alkoxysilane.

The preflush treatment fluid can be used, for example, to place a catalyst for the hydrolysis of the alkoxysilane into the treatment zone. Depending on various factors such as the time between forming the treatment fluid with the alkoxysilane and its introduction into the treatment zone, temperature, and other factors, it may be desirable to introduce a catalysis separately from the treatment fluid. Preferably, the preflush treatment fluid comprises a continuous aqueous phase. More preferably, the preflush treatment fluid comprises an inorganic salt, for example, KCl.

Catalyst

The rate of hydrolysis of an alkoxysilane bond can be increased in the presence of a catalyst. Preferably, the method additionally includes the step of providing a catalyst for hydrolysis of the alkoxysilane in the subterranean formation. The catalyst can be base, acid, or a transition metal. For example, transition metals such as titanium(IV) or zirconium(IV) can catalyze the rate of hydrolysis of an alkoxysilane. Suitable examples of such transition metals include titanium(IV) isopropoxide, titanium(IV) chloride, and zirconium(IV) chloride.

The catalyst can be included in the treatment fluid with the alkoxysilane or it can be desirable to place the catalyst into the treatment zone prior to introducing the treatment fluid with the alkoxysilane.

In an embodiment, the step of providing a catalyst comprises adjusting the pH of the continuous aqueous phase of the treatment fluid or a preflush treatment fluid to be greater than 9. More preferably, a basic pH is in the range of about 9 to about 12.

In an embodiment, the step of providing a catalyst comprises adjusting the pH of the continuous aqueous phase of the treatment fluid is less than 5. Preferably, an acidic pH is in the range of about 3 to about 5.

In an embodiment, the step of providing a catalyst comprises forming the treatment fluid comprising the catalyst, wherein the catalyst is selected from the group consisting of: titanium(IV), zirconium(IV), and any combination thereof.

It should be within the ability of one skilled in the art, with the benefit of this disclosure, to select a suitable catalyst for use in embodiments of the present invention and to determine whether a catalyst is required to trigger timely curing.

pH and pH Adjuster

Preferably, the pH of the continuous aqueous phase of the treatment fluid is in a specified range. The treatment fluids can include a pH-adjuster. The pH-adjuster may be present in the treatment fluids in an amount sufficient to maintain or adjust the pH of the fluid. Preferably, the pH adjuster does not have undesirable properties.

In general, a pH-adjuster may function, inter alia, to affect the hydrolysis rate. In some embodiments, a pH-adjuster may be included in the treatment fluid, inter alia, to adjust the pH of the treatment fluid to, or maintain the pH of the treatment fluid near, a pH that balances the duration of certain properties of the treatment fluid (e.g., the ability to flow as a liquid with the ability of agglomerating fines).

In some embodiments, the pH-adjuster can comprise a small concentration of a strong base such as NaOH, $Na_2CO_3$, and $Mg(OH)_2$. In other embodiments, the pH-adjuster can comprise a small concentration of a strong acid such as HCl. In other embodiments, the pH-adjuster may be any other substance known in the art capable of maintaining the pH in a limited range. One of ordinary skill in the art, with the benefit of this disclosure, will recognize the appropriate pH-adjuster and amount thereof to use for a chosen application.

Other Fluid Additives

A fluid for use in according to the methods of the invention can contain additives that are commonly used in oil field applications, as known to those skilled in the art. These include, but are not necessarily limited to, brines, inorganic water-soluble salts, salt substitutes (such as trimethyl ammonium chloride), pH control additives, surfactants, breakers, breaker aids, oxygen scavengers, alcohols, scale inhibitors, corrosion inhibitors, hydrate inhibitors, fluid-loss control additives, oxidizers, chelating agents, water control agents (such as relative permeability modifiers), consolidating agents, proppant flowback control agents, conductivity enhancing agents, clay stabilizers, sulfide scavengers, fibers, nanoparticles, bactericides, and combinations thereof.

Of course, additives should be selected for not interfering with the purpose of the treatment fluid.

Mechanical Sand Control Device

Preferably, the mechanical sand control device is selected from the group consisting of: a perforated liner, a slotted pipe, a wire-wrapped screen, a non-expandable screen, and an expandable screen.

Preferably, the mechanical sand control device is not gravel packed.

Optional Steps

The method can optionally or advantageously include additional steps.

Preferably, the treatment zone and job conditions are selected such that the design temperature is in the range of about 60° C. to about 200° C.

The method can include the step of, prior to introducing the treatment fluid: isolating a zone of interest in the subterranean.

A treatment fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

In certain embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a fluid into a well is within a relatively short period after forming the fluid, e.g., less within 30 minutes to one hour. More preferably, the step of delivering the fluid is immediately after the step of forming the fluid, which is "on the fly."

It should be understood that the step of delivering a treatment fluid into a well can advantageously include the use of one or more fluid pumps.

In an embodiment, the step of introducing is at a rate and pressure below the fracture pressure of the treatment zone. For example, the treatment fluid is introduced to the subterranean formation at a matrix flow rate. That is, the composition is added at such a rate that it is able to penetrate the formation without substantially affecting the structure of the formation sands or proppant or gravel matrixes it encounters.

In an embodiment, the step of introducing a treatment comprises introducing under conditions for fracturing a treatment zone. The fluid is introduced into the treatment zone at a rate and pressure that are at least sufficient to fracture the zone.

The step of introducing the treatment fluid with the alkoxysilane can be performed either before or after the sand screen installation or gravel packing are completed. It is beneficial to provide a method that transforms small formation sand or fines into larger aggregates. Preferably, this does not reduce permeability of the formation, and the permeability may be increased. This enhances the retention of fines behind the screen without plugging or eroding it.

After the step of introducing a treatment fluid comprising an alkoxysilane, the zone is shut in to allow time for the alkoxysilane to hydrolyze in the well under the design conditions. This preferably occurs with time under the temperature, pressure, and other conditions in the zone.

The method can include the step of: after the steps of shutting in and installing the mechanical sand control device, producing fluid from the subterranean formation through the mechanical sand control device.

Preferably, the step of shutting in is for at least a sufficient time for at least 50% by weight of the alkoxysilane to hydrolyze in the treatment zone under the design conditions.

Preferably, after any such well treatment, a step of producing hydrocarbon from the subterranean formation is the desirable objective.

Examples

To facilitate a better understanding of the present invention, the following examples of certain aspects of some embodiments are given. In no way should the following examples be read to limit, or define, the entire scope of the invention.

Representative Treatment Zone with Sand Screen

Referring to the drawing, FIG. 1 illustrates a horizontal open-hole wellbore 10. The wellbore 10 extends into an unconsolidated subterranean formation or zone 12 from a cased wellbore extending to the surface. While wellbore 10 is illustrated as a horizontal open-hole completion, it should be recognized that the present invention is also applicable to vertical or inclined wellbores, and to cased wellbores.

A sand screen 20 is located inside wellbore 10. Sand screen 20 has a "cross-over" sub connected to its upper end, which is suspended from the surface on a tubing or work string (not shown). A packer 26 is attached to the crossover. The cross-over and packer 26 are conventional gravel pack forming tools and are well known to those skilled in the art. The packer 26 is used to permit crossover during packing and to isolate a portion of the wellbore. The crossover provides channels for the circulation of gravel slurry to form a gravel pack 42 (shown partially formed) in the annulus 23 on the outside of the sand screen 20 and returns circulation of fluid through the sand screen 20 and up the washpipe 28. The washpipe 28 is attached to the gravel pack service tool and is run inside the sand screen 20. The washpipe 28 is used to force fluid to flow around the bottom section of the sand screen 20.

Sand screen 20 may be of a single length or it may be comprised of a plurality of screen units 35 which are connected together with threaded couplings or the like (not shown). As shown, each of the screen units 35 is basically identical to each other and each is comprised of a perforated base pipe having a continuous length of wrap wire wound thereon, which forms a "screen section" therein. The base pipe can have a plurality of perforations therein, or other types of permeable base pipes, e.g., slotted pipe, etc., can be used without departing from the present invention.

It should be understood that in a method according to the invention, gravel packing is not necessary.

Core Flow Tests with TEOS

Core flow tests were carried out on sandpacks simulating an unconsolidated subterranean formation to evaluate the effectiveness of treatment with TEOS. Incremental differential pressure was applied to evaluate particle mobilization without TEOS treatment (control test) compared to treatment with TEOS. The fluids collected for both the cases were then analyzed using turbidity meter. Regained permeability was also determined for both cases. These tests showed particles are not dislodging after the treatment and agglomeration. In addition, sieve analysis and microscopic analyses were performed to evaluate particle agglomeration with TEOS treatment.

Sandpacks were prepared using 20/40 mesh Ottawa sand and 200 mesh sand (50:50), with additional layers of 20/40 sand (~1 cm) at both ends. The two ends of the sandpack were closed using 300 mesh screens. The sandpacks were initially saturated with 3% KCl aqueous solution and initial permeability of the sandpack to the 3% KCl solution was determined.

Such a sandpack was further saturated with 10 M NaOH aqueous solution, followed by saturation with tetraethylorthosilicate, and then the sandpack was shut in for 24 hours at 150° F. 25 ml of TEOS without any dilution was used in laboratory experiments. After 24 hours, final permeability was determined by changing the mesh size to 40. The fluid was also collected for turbidity analysis under different pressures. The turbidity meter was a Systronics Digital Nephelo Turbidity Meter 132.

Results of initial and final permeability and turbidity analyses are tabulated in Table 1.

TABLE 1

| Permeability | Sandpack-1 with TEOS treatment | Sandpack-2 Control Sample without treatment |
|---|---|---|
| Initial Brine Permeability | 98 mD | ~100 mD |
| Final Permeability | 110 mD | |
| Turbidity analysis Up to 200 psi | Traces of particles at less than the instrumental limit | 400 NTU |

A good regained perm observed during the tests definitely ensures that the fluid did not damage the formation.

A fluid collected at 200 psi without TEOS treatment was highly turbid having a milky appearance; whereas a fluid collected after a TEOS treatment provided a clear, transparent solution having the appearance of clean water. The clear solution collected under pressure after TEOS treatment confirms that the newly identified treatment was able to hold the fines particles up to 200 psi. Whereas in control sample high turbidity value (400 NTU) reveals the continuous flow of fines under pressure due to absence of fines agglomeration.

In order to see agglomeration of particles, scanning electron micrographs (SEM) were taken after TEOS treatment and compared against control run (without any treatment).

Figure 2:
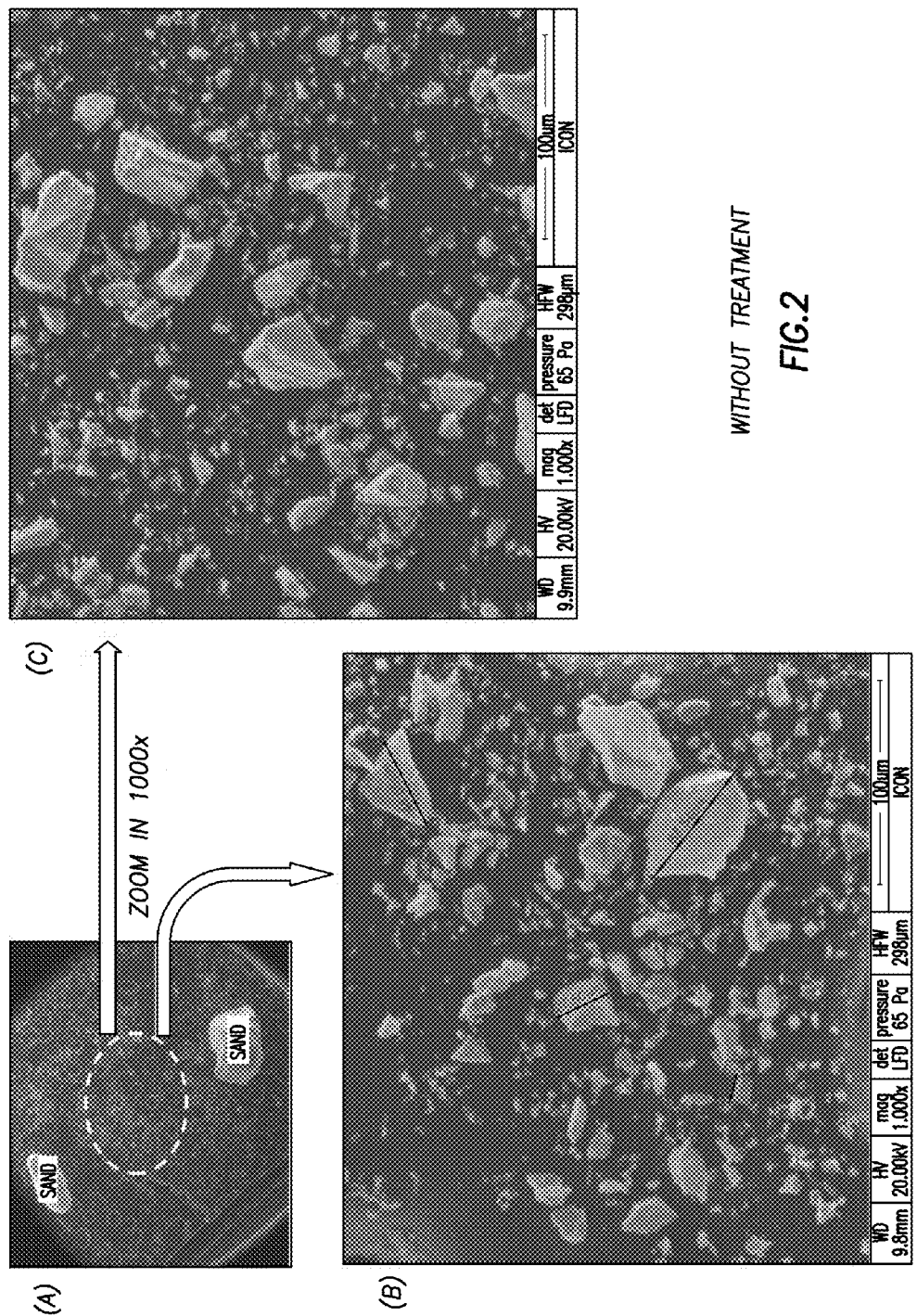
FIG. 2 illustrates scanning electron micrographs of a simulated unconsolidated sandstone formation of 20/40 mesh sand and 200 mesh sand (50:50) without any chemical treatment, as a control.

FIG. 2 illustrates scanning electron micrographs of a simulated unconsolidated sandstone formation of 20/40 mesh sand and 200 mesh sand (50:50) without any chemical treatment and then drying the sample, as a control. In FIG. 2, SEM micrograph (A) is without zoom. Micrographs (B) and (C) are zoom in images at 1000× in the dotted circular area of micrograph (A). At higher resolution, the particulate material is clearly loosely dispersed with varied size range. Fines are randomly distributed and no agglomeration is observed.

Figure 3:
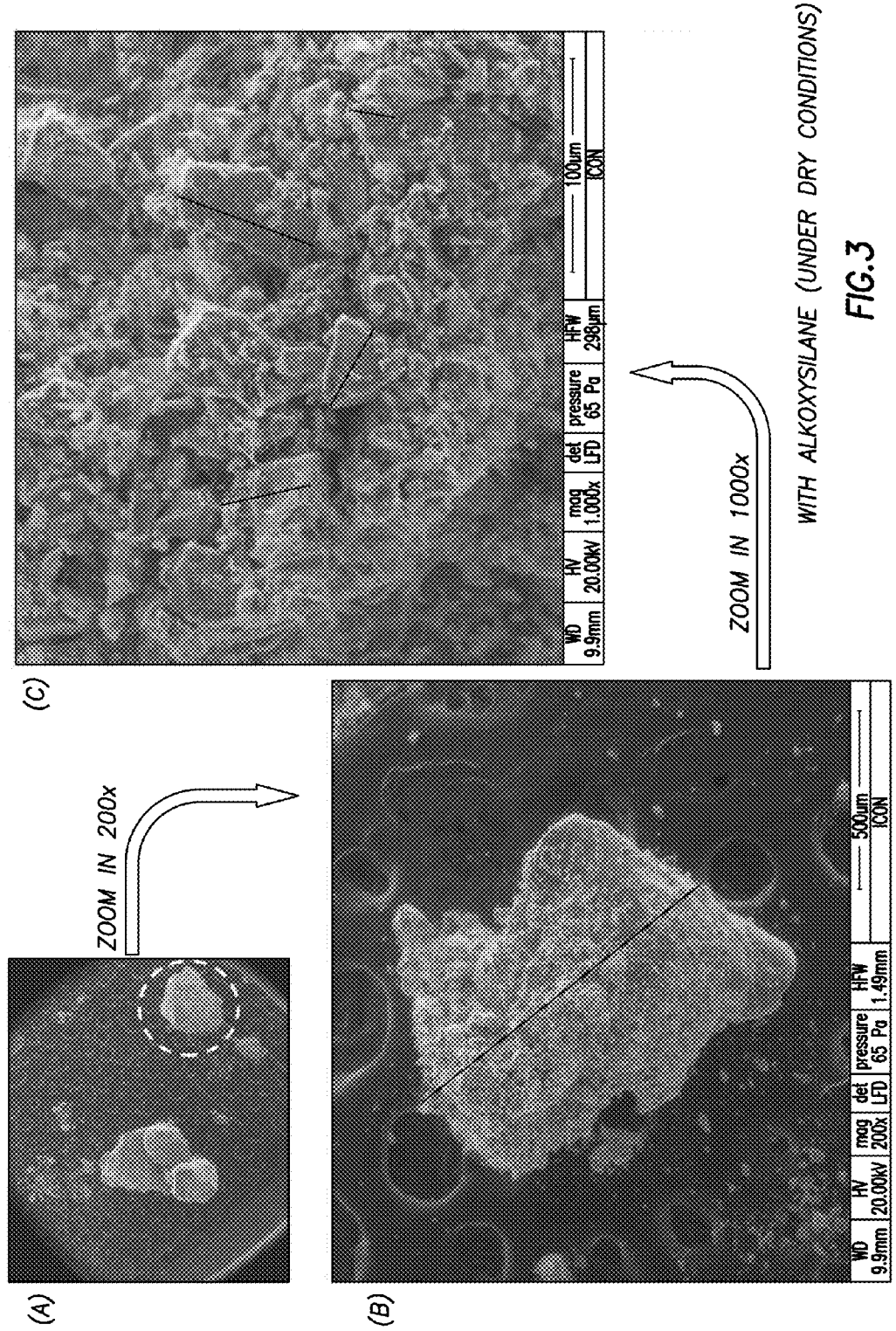
FIG. 3 illustrates scanning electron micrographs of a simulated unconsolidated sandstone formation of 20/40 mesh sand and 200 mesh sand (50:50) after treatment with TEOS and then drying the sample.

FIG. 3 illustrates scanning electron micrographs of a simulated unconsolidated sandstone formation of 20/40 mesh sand and 200 mesh sand (50:50) after treatment with TEOS and then drying the sample. In FIG. 3, SEM micrograph (A) is without zoom. Micrograph (B) is a zoom image at 200× and micrograph (C) is a zoom image at 1000× in the dotted circular area of micrograph (A). Few agglomerates are observed in image (A). In micrographs (B) and (C), agglomeration of loosely dispersed 200 mesh sand into a small chunk of particles in presence of TEOS can clearly be seen. These micrographs clearly confirm particle agglomeration do exists.

Figure 4:
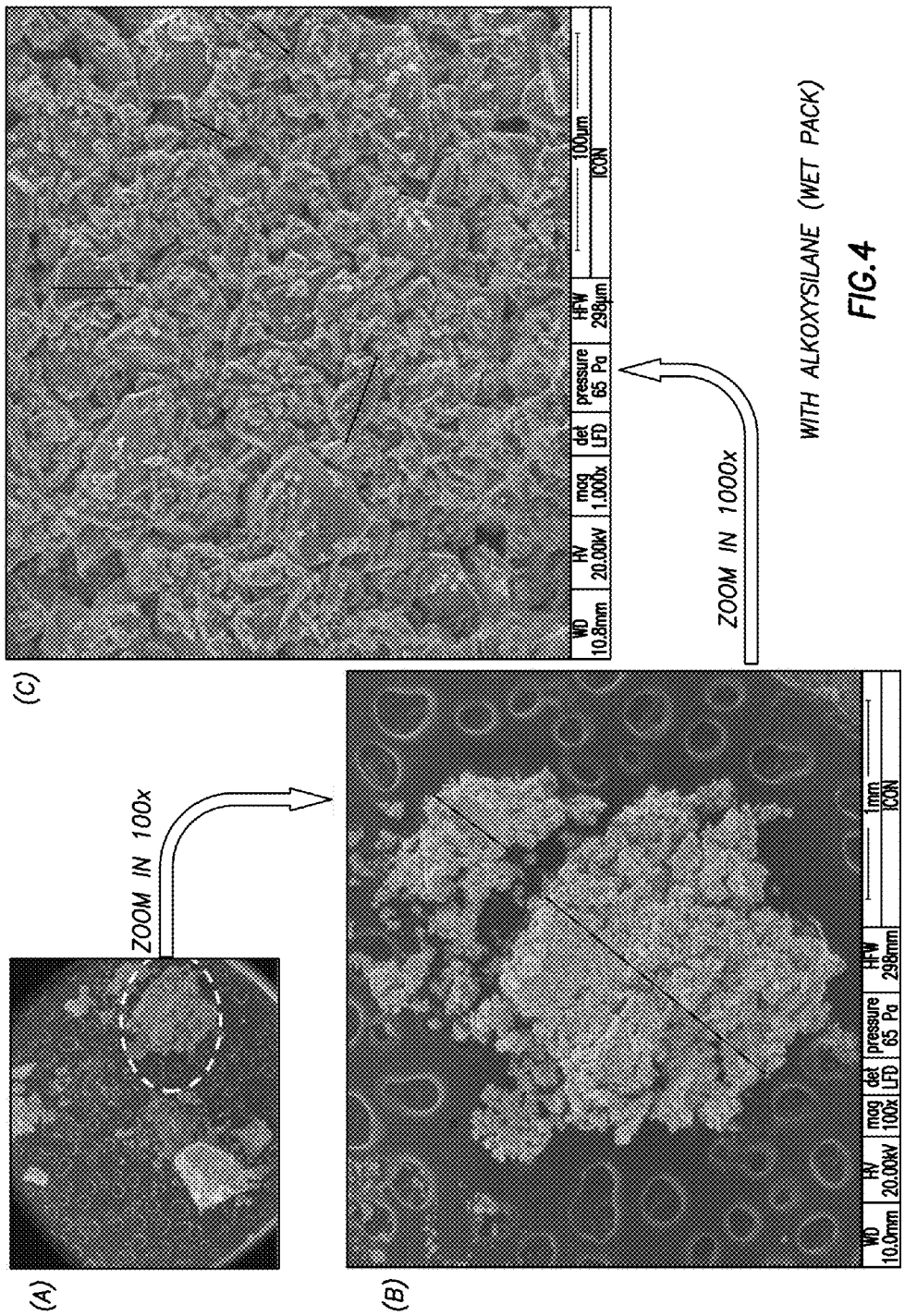
FIG. 4 illustrates scanning electron micrographs of a simulated unconsolidated sandstone formation of 20/40 mesh sand and 200 mesh sand (50:50) after treatment with TEOS in a wet condition.

FIG. 4 illustrates scanning electron micrographs of a simulated unconsolidated sandstone formation of 20/40 mesh sand and 200 mesh sand (50:50) after treatment with TEOS in a wet condition. In FIG. 4, SEM micrograph (A) is without zoom. Micrograph (B) is a zoom image at 100× and micrograph (C) is a zoom image at 1000× in the dotted circular area of micrograph (A). Agglomeration of particles under wet condition can be clearly observed.

Conclusion

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method for treating a zone of a subterranean formation penetrated by a wellbore, the method comprising the steps of:
    (A) introducing a treatment fluid through the wellbore into the zone of the subterranean formation, wherein the treatment fluid consists of an aqueous phase, a pH adjuster, and one or more tetra alkoxy silanes;
    (B) introducing a catalyst through the wellbore into the zone of the subterranean formation;
    (C) shutting in the zone to allow the one or more tetra alkoxysilanes to hydrolyze in the presence of the catalyst in the subterranean formation; and (D) before or after introducing the treatment fluid into the zone, installing a mechanical sand control device in the wellbore of the zone.

2. The method according to claim 1, wherein the subterranean formation is a sandstone formation.

3. The method according to claim 1, wherein the subterranean formation is a gas reservoir having a permeability greater than about 5 mD.

4. The method according to claim 1, wherein the subterranean formation is an oil reservoir having a permeability greater than about 20 mD.

5. The method according to claim 1, wherein the one or more tetra alkoxy silanes comprise alkoxy groups independently selected from an —OR group wherein R is a methyl, ethyl, propyl, isopropyl, butyl, or isobutyl group.

6. The method according to claim 1, wherein the one or more tetra alkoxysilanes do not comprise a vinyl group.

7. The method according to claim 1, wherein the one or more tetra alkoxysilanes is in a concentration of at least 10% by weight of the aqueous phase of the treatment fluid.

8. The method according to claim 1, additionally comprising the step of: saturating the zone of the subterranean formation with a preflush treatment fluid.

9. The method according to claim 8, wherein the preflush treatment fluid comprises a continuous aqueous phase that comprises an inorganic salt.

10. The method according to claim 1, further comprising adjusting the pH of the aqueous phase of the treatment fluid to be greater than 9.

11. The method according to claim 1, further comprising adjusting the pH of the aqueous phase of the treatment fluid to be less than 5.

12. The method according to claim 1, wherein the catalyst is selected from the group consisting of: titanium(IV) or zirconium(IV), and any combination thereof.

13. The method according to claim 1, wherein the mechanical sand control device is selected from the group consisting of: a perforated liner, a slotted pipe, a wire-wrapped screen, a non-expandable screen, and an expandable screen.

14. The method according to claim 1, wherein the mechanical sand control device is not gravel packed.

15. The method according to claim 1, further comprising the step of: before or after the step of introducing the treatment fluid, introducing a fracturing fluid into the wellbore at a pressure sufficient to create at least one fracture in the subterranean formation.

16. The method according to claim 1, the method further comprising the step of: after the steps of shutting in and installing the mechanical sand control device, producing fluid from the subterranean formation through the mechanical sand control device.

17. The method according to claim 1, wherein the pH adjuster is a strong base or a strong acid.

18. The method according to claim 1, wherein the pH adjuster comprises at least one component selected from the group consisting of: NaOH, $Na_2CO_3$, and $Mg(OH)_2$.

* * * * *